United States Patent
Kinoshita et al.

(10) Patent No.: US 7,982,341 B2
(45) Date of Patent: Jul. 19, 2011

(54) TRANSFORMER OPERATION CONTROL APPARATUS AND METHOD FOR SUPPRESSING MAGNETIZING INRUSH CURRENT

(75) Inventors: Sadayuki Kinoshita, Tokyo (JP); Kenji Kamei, Tokyo (JP); Tomohito Mori, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 737 days.

(21) Appl. No.: 12/103,748

(22) Filed: Apr. 16, 2008

(65) Prior Publication Data

US 2009/0134862 A1   May 28, 2009

(30) Foreign Application Priority Data

Nov. 27, 2007   (JP) .................................. 2007-305639

(51) Int. Cl.
*H01H 33/59* (2006.01)
*H01H 47/00* (2006.01)

(52) U.S. Cl. ....................................................... 307/115
(58) Field of Classification Search .................... 307/115
See application file for complete search history.

(56) References Cited

U.S. PATENT DOCUMENTS
6,493,203 B1 * 12/2002 Ito et al. ........................ 361/159
7,259,947 B2 * 8/2007 Kinoshita et al. ............... 361/85

FOREIGN PATENT DOCUMENTS
JP   2004-208394 A   7/2004
JP   2006-040566 A   2/2006

* cited by examiner

*Primary Examiner* — Jared J Fureman
*Assistant Examiner* — Dru M Parries
(74) *Attorney, Agent, or Firm* — Buchanan Ingersoll & Rooney PC

(57) ABSTRACT

A control portion 80 for a breaker 10 causes the breaker 10 to apply a current of a first apply phase (R phase) at a timing where a residual flux of R phase agrees with a steady magnetic flux. Thereafter, the control portion 80 determines whether or not the current measured by current measuring portions 40R, 40S, 40T exceeds a threshold value. When the measured current does not exceed the threshold value, the control portion 80 causes the breaker 10 to apply currents of the other two phases (S and T phases) at a timing where a voltage of R phase becomes zero. When the measured current exceeds the threshold value, the control portion 80 causes the breaker 10 to once shut off the current of R phase and to apply again the current of R phase.

15 Claims, 9 Drawing Sheets

TRANSFORMER OPERATION CONTROL APPARATUS AND METHOD FOR SUPPRESSING MAGNETIZING INRUSH CURRENT

BACKGROUND OF THE INVENTION

1. Field of the Invention

The present invention relates to a transformer operation control apparatus and method for suppressing a magnetizing inrush current that transiently passes through a transformer, when the transformer is connected to an electric power system.

2. Description of the Background Art

For suppressing a magnetizing inrush current, it is important to control the timing for applying a current to the transformer.

Japanese Patent Laying-Open No. 2004-208394 discloses the following technique. A magnetic flux signal is calculated by integrating the transformer-side voltage of the breaker for each phase. A difference between a magnetic flux value at the time point where the transformer-side voltage has converged to zero value after input of an open command, and a center value of the magnetic flux signal before the input of the open command is calculated as a residual flux. Then, the phase where the absolute value of the residual flux is greatest is set as a first closing phase. As to the timing of applying the current of the first closing phase, a timing when an apply magnetic flux difference, which is an absolute value of the maximum difference between the steady magnetic flux value and the residual flux value, is greatest is calculated based on the residual flux of the first closing phase and the pre-arc characteristics and closing time variation characteristics of the three-phase breaker obtained in advance, and set as a target apply time point of the first closing phase.

As to the applying timing for the currents of the other two phases, a timing when the apply magnetic flux difference is smallest when residual flux is 0 is calculated, based on the pre-arc characteristics and closing time variation characteristics of the three-phase breaker obtained in advance, and set as a target apply time point of the other two phases. Then, the sum of the time from the reference point until the target apply time point of the two other phases and a delay time corresponding to an integral multiple of a cycle of the three-phase power supply having been set in advance is set as a target apply time of the other two phases.

Japanese Patent Laying-Open No. 2006-040566 discloses the following technique. Each contact in each arc-extinguishing chamber of a breaker is opened simultaneously for the three phases at the voltage zero point of one of the three phases, whereby currents are shut off. Then, setting the one phase opened at the voltage zero point as a first apply phase, and taking into consideration of a residual flux of the transformer, the optimum time point where a magnetizing inrush current at the time of current application is smallest is set as a target apply time point of the first apply phase. Herein, the target apply time point of the first apply phase is the time point when the residual flux of the one phase of the transformer agrees with the steady magnetic flux. As to the applying timing for the currents of the other two phases, the voltage zero point of the first apply phase at arbitrary time point after the closing time point of the first apply phase is set as a target apply time point of the second and third apply phases.

According to the conventional techniques, the apply timing of the first apply phase in which a current is applied firstly among the three phases may deviate from the target apply time point, because of variations in the closing operation time of the breaker or variations in the pre-arc time. In such a case, a magnetic flux by the current passing in the first apply phase is superimposed on a residual direct current component magnetic flux. Then, transient magnetic saturation occurs and a magnetizing inrush current passes. In this case, as to the other two phases, even if a current is applied at the timing where the voltage of the first apply phase becomes 0, magnetizing inrush currents also transiently pass in the other two phases, which are hostile to the transformer.

SUMMARY OF THE INVENTION

An object of the present invention is to provide a transformer operation control apparatus and method that are capable of minimizing a period during which a magnetizing inrush current passes through a transformer, even when the closing operation time of a breaker and a pre-arc time and the like vary.

Summarizing the present invention, a transformer operation control apparatus includes: a transformer connected to a three-phase electric power system; a breaker connected between the electric power system and the transformer, a first voltage measuring portion measuring a voltage of each phase, on a side of the electric power system, of the breaker; a second voltage measuring portion measuring a voltage of each phase, on a side of the transformer, of the breaker; and a control portion. The breaker is capable of shutting off and applying a current for each phase of three phases. The control portion receives an opening command and a closing command, and controls timing for shutting off and applying the current for each phase by the breaker. Specifically, when the control portion receives the closing command, the control portion exerts control so that the breaker applies a current of a first phase among the three phases at a target apply time point determined based on measurement values of the first and second voltage measuring portions, and the control portion determines whether or not a determination condition for verifying a suppression effect on a magnetizing inrush current is satisfied. When the determination condition is not satisfied, the control portion exerts control so that the breaker shuts off the current of the first phase and again applies the current of the first phase at the target apply time point determined again based on the measurement values of the first and second voltage measuring portions, and the control portion determines again whether or not the determination condition is satisfied. When the determination condition is satisfied, the control portion exerts control so that the breaker applies currents of the other two phases except for the first phase.

According to another aspect of the present invention, an operation control method for a transformer connected to a three-phase electric power system via a breaker includes the steps of: measuring a voltage, on a side of the transformer, of the breaker; measuring a voltage, on a side of the electric power system, of the breaker; when applying a current by the breaker, selecting a first phase among three phases, and applying by the breaker the current of the first phase at a target apply time point determined based on measurement values of the voltages, on the side of the transformer and on the side of the electric power system, of the breaker; determining whether or not a determination condition for verifying a suppression effect on a magnetizing inrush current is satisfied; when the determination condition is satisfied, applying by the breaker currents of the other two phases except for the first phase; and when the determination condition is not satisfied, shutting off by the breaker the current of the first phase, and thereafter performing again the step of applying the current of the first phase and the step of determining.

According to the present invention, whether or not a magnetizing inrush current is suppressed is determined after the current of the first phase is applied. When the suppression effect on the magnetizing inrush current is verified, the currents of the other two phases are applied by the breaker. Accordingly, the primary advantage of the present invention is that control can be exerted such that the period during which the magnetizing inrush current passes through the transformer is minimized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
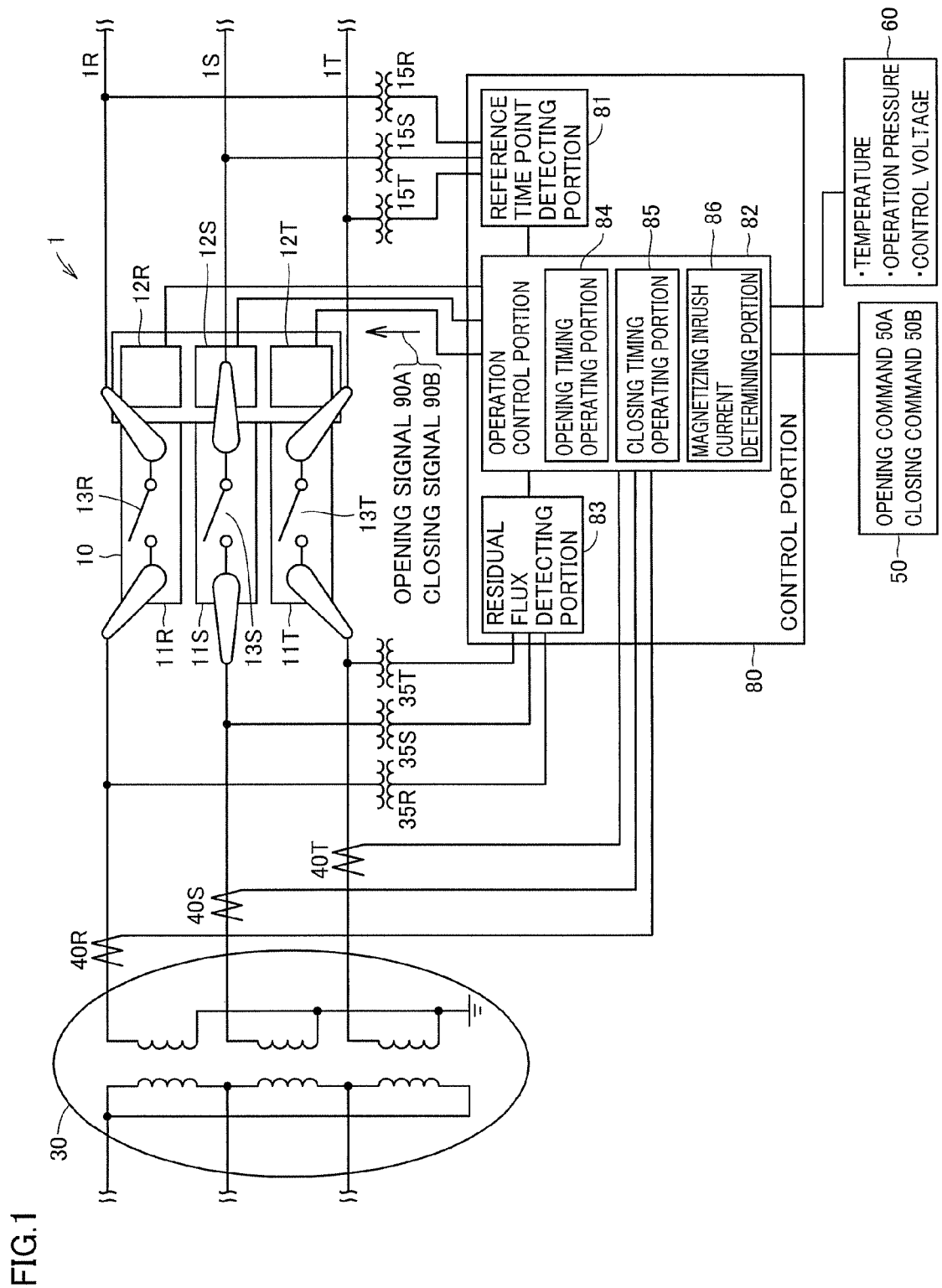
FIG. 1 is a block diagram showing a configuration of a transformer operation control apparatus 1 of a first embodiment of the present invention.

In the following, embodiments of the present invention is described in detail referring to the drawings. The same or corresponding parts are denoted by the same reference character, and description thereof is not repeated.

First Embodiment

FIG. 1 is a block diagram showing a configuration of a transformer operation control apparatus 1 of a first embodiment of the present invention. Referring to FIG. 1, transformer operation control apparatus 1 includes a transformer 30 and a breaker 10.

Transformer 30 is a three-phase transformer connected by Y-Δ connection. Specifically, the winding on the power supply side of transformer 30 is connected by Y connection having the neutral point grounded, while the winding on the load side is connected by Δ connection.

Breaker 10 is connected between lines of an electric power system including phases of R phase 1R, S phase 1S and T phase 1T and transformer 30. Breaker 10 includes arc-extinguishing chambers 11R, 11S, 11T provided with respective contacts 13R, 13S, 13T, and operation devices 12R, 12S, 12T opening/closing respective contacts 13R, 13S, 13T. Operation devices 12R, 12S, 12T are separately provided for respective phases to allow contacts 13R, 1S, 13T of respective R, S, T phases to independently open and close.

Transformer operation control apparatus 1 further includes first voltage measuring portions 15R, 15S, 15T provided on the electric power system side of breaker 10; second voltage measuring portions 35R, 35S, 35T provided on the transformer 30 side of breaker 10; current measuring portions 40R, 40S, 40T provided on the transformer 30 side of breaker 10; and a control portion 80.

Voltage measuring portions 15R, 15S, 15T and voltage measuring portions 35R, 35S, 35T are, for example, transformers for meters, and provided for respective phases for measuring voltages of respective phases.

Current measuring portions 40R, 40S, 40T are, for example, current transformers for meters, and provided for respective phases for measuring alternating currents of respective phases passing through breaker 10.

Control portion 80 is configured based on a computer including a CPU (Central Processing Unit) and memory and controls opening/closing of breaker 10 in response to opening/closing command 50. The measurement values from aforementioned voltage measuring portions 15R, 15S, 15T, voltage measuring portions 35R, 35S, 35T and current measuring portions 40R, 40S, 40T are digitally converted by an A/D (Analog to Digital) converter accommodated in the computer and input to control portion 80. Further, control portion 80 receives measurement data 60 of ambient temperature, operation pressure, control voltage of operation devices 12R, 12S, 12T. In order to suppress a magnetizing inrush current, control portion 80 outputs opening signal 90A/closing signal 90B to operation devices 12R, 12S, 12T of breaker 10 at appropriate timing based on each measurement value and measurement data 60, thereby allowing contacts 13R, 13S, 13T of breaker 10 to open/close.

Functionally, control portion 80 is configured to include a reference time point detecting portion 81, a residual flux detecting portion 83, and an operation control portion 82. The functions of respective portions 81-83 are realized by execution of a program by the computer constituting control portion 80.

Reference time point detecting portion 81 performs operation processing using the measurement values of voltage measuring portions 15R, 15S, 15T on the electric power system side. For example, reference time point detecting portion 81 detects zero point of AC (Alternating Current) voltage on the electric power system side in order to determine the reference time point for outputting opening/closing signal to breaker 10.

Residual flux detecting portion 83 performs operation processing using the measurement values of voltage measuring portions 35R, 35S, 35T on the transformer side. For example, residual flux detecting portion 83 integrates voltage waveforms measured on transformer 30 side when breaker 10 shuts off currents, thereby calculating residual flux remaining in the core of each phase of transformer 30.

Operation control portion 82 controls opening/closing operation of breaker 10, based on the operation result of reference time point detecting portion 81 and residual flux detecting portion 83. Operation control portion 82 includes an opening timing operating portion 84 for calculating a time point for outputting opening signal 90A provided to breaker 10 in response to opening command 50A, and a closing timing operating portion 85 for calculating a time point for outputting closing signal 90B provided to breaker 10 in response to closing command 50B.

Further, operation control portion 82 includes a magnetizing inrush current determining portion 86 for verifying the suppressing effect on the magnetizing inrush current. In the first embodiment, under a determination condition that whether or not an absolute value of a current measured by current measuring portions 40R, 40S, 40T has exceeded a predetermined threshold current during a predetermined determination time after the current is applied, the magnetizing inrush current suppression effect can be verified. Here, for the determination time for determining the magnetizing inrush current suppression effect, one cycle time of AC power supply is enough. The threshold current is set in advance, for example, in a range between 50% and 100% of the rated current of the transformer.

In the following, according to opening/closing procedure of breaker 10, the function of control portion 80 will be described in further detail.

Figure 2:
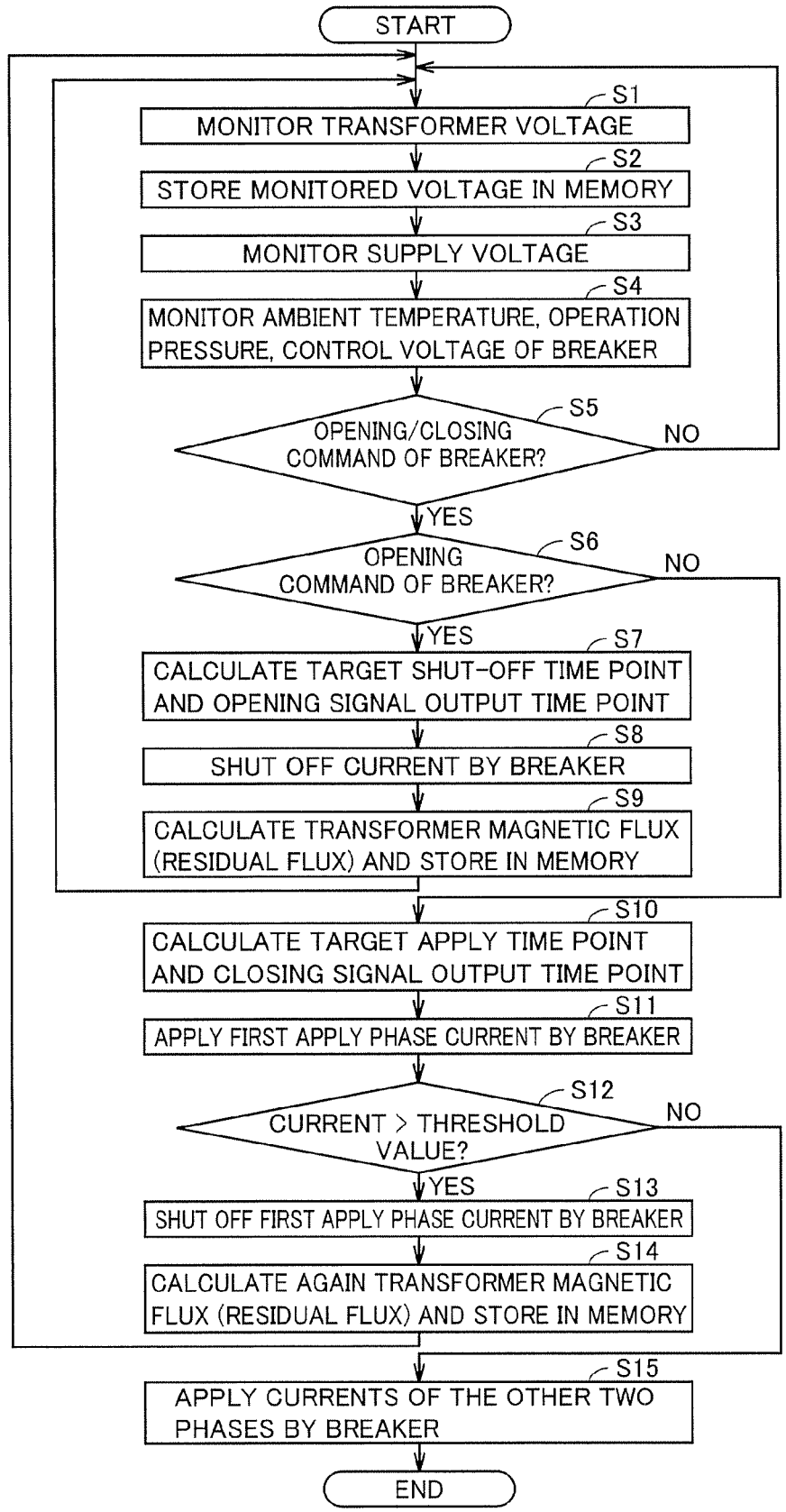
FIG. 2 is a flowchart showing a control procedure of the opening/closing operation of breaker 10 by control portion 80 in FIG. 1.

FIG. 2 is a flowchart showing a control procedure of the opening/closing operation of breaker 10 by control portion 80 in FIG. 1. FIG. 2 shows a control procedure from a state where control portion 80 in receipt of opening command 50A causes breaker 10 in closed state to open, and until a state where control portion 80 thereafter in receipt of closing command 50B causes breaker 10 to close again. In the following, referring to FIGS. 3-5 as appropriate, the control procedure of control portion 80 shown in FIG. 2 is specifically described.

Referring to FIG. 2, when control portion 80 receives none of opening command 50A and closing command 50B of breaker 10 (NO in step S5), control portion 80 repeatedly performs steps S1-S4.

In step S1, the voltage on transformer 30 side of breaker 10 (hereinafter also referred to as the transformer voltage) is monitored by voltage measuring portions 35R, 35S, 35T. In the following step S2, residual flux detecting portion 83 of control portion 80 obtains the monitored transformer voltage, and stores it in the internal memory of control portion 80. The transformer voltage stored in the memory is used in steps S9 and S14 to calculate the residual flux remaining in the core of transformer 30 when breaker 10 opens.

In the next step S3, the voltage on the electric power system side of breaker 10 (hereinafter also referred to as the supply voltage) is monitored by voltage measuring portions 15R, 15S, 15T. The monitored supply voltage is obtained by reference time point detecting portion 81 of control portion 80, and used in steps S7 and S10 for calculating timing of opening and closing.

In the next step S4, measurement data 60 of ambient temperature, operation pressure, control voltage of operation devices 12R, 12S, 12T of breaker 10 is monitored by operation control portion 82 of control portion 80. The monitored measurement data is used in steps S7 and S10 for calculating timing of opening and closing.

If control portion 80 receives open command 50A (YES in step S5, YES in step S6) when control portion 80 is repeatedly performing the above-described steps S1-S4, control portion 80 performs the opening operation of breaker 10 in steps S7-S9 in order. In the opening operation of breaker 10, breaker 10 shuts off currents of the three phases simultaneously.

Figure 3:
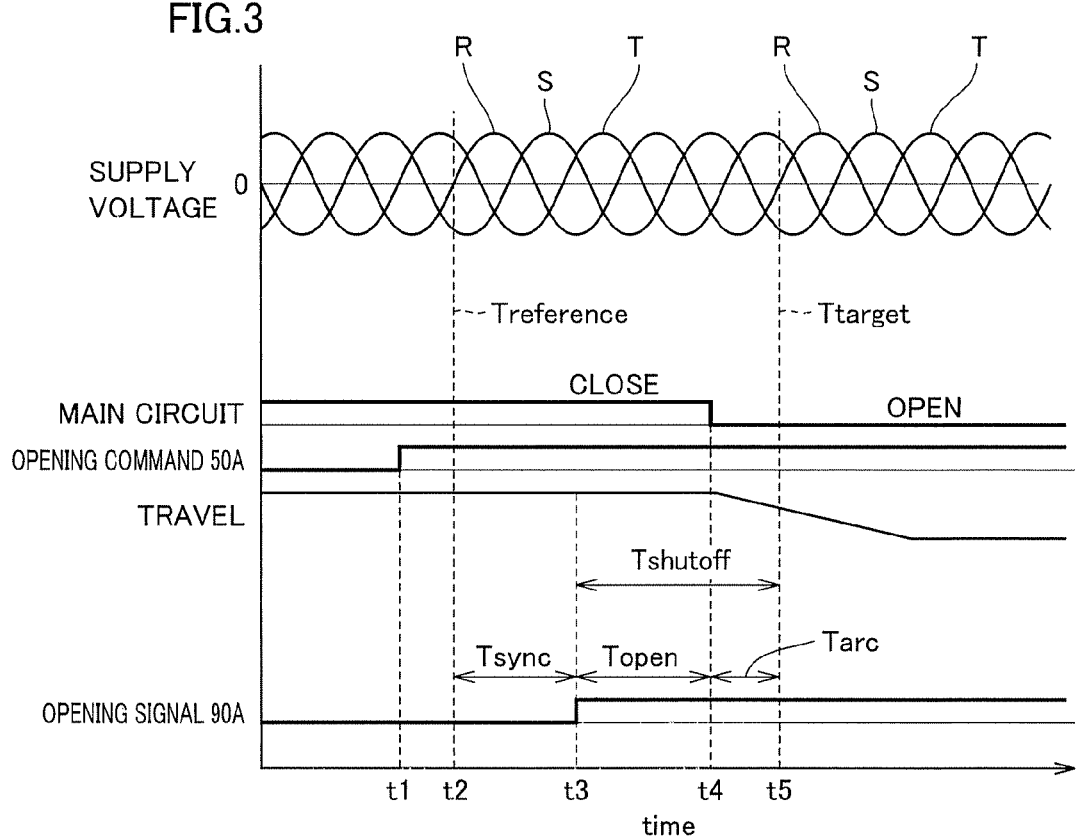
FIG. 3 is a timing chart used for describing the opening operation of breaker 10.

FIG. 3 is a timing chart used for describing the opening operation of breaker 10. In FIG. 3, the vertical axis shows, from the upper side, the supply voltage of each phase, opening/closing state of a main circuit of breaker 10, opening command 50A, an operation track (travel) of the contact of breaker 10, and opening signal 90A. The horizontal axis shows the elapsed time. Reference characters R, S, T represent R, S, T phases, respectively.

Referring to FIG. 3, receiving opening command 50A at time point t1, reference time point detecting portion 81 of control portion 80 detects the cycle of voltage zero point of each phase, based on the voltage values measured by voltage measuring portions 15R, 15S, 15T on the electric power system side. Then, selecting one of the phases (here, R phase) as the reference phase, control portion 80 sets the voltage zero point of the reference phase as a reference time point $T_{reference}$ (time point t2 in FIG. 3). The selection information of the reference phase and reference time point $T_{reference}$ are stored in the memory of control portion 80.

Taking into account of a shut-off time $T_{shutoff}$, which will be described later, opening timing operating portion 84 of control portion 80 sets a target shut-off time point $T_{target}$, which is a time point where breaker 10 shuts off currents simultaneously for the three phases (time point t5 in FIG. 3). Target shut-off time point $T_{target}$ is set to the voltage zero point of reference phase (R phase) and stored in the memory of control portion 80.

Further, in order to calculate the time point for outputting opening signal 90A to breaker 10 (time point t3 in FIG. 3), opening timing operating portion 84 calculates an expected shut-off time $T_{shutoff}$ based on measurement data 60 of ambient temperature, operation pressure, control voltage of operation devices 12R, 12S, 12T. The calculated shut-off time $T_{shutoff}$ is stored in the memory of control portion 80. Here, shut-off time $T_{shutoff}$ is expressed by the sum of opening operation time $T_{open}$ and an arc time $T_{arc}$ of the reference phase (R phase). Opening operation time $T_{open}$ is the time since operation control portion 82 outputs opening signal 90A to breaker 10 and until contacts 13R, 13S, 13T of breaker 10 open (the time between time points t3 and t4 in FIG. 3). Arc time $T_{arc}$ is the time since contact 13R of the reference phase (R phase) of breaker 10 opens and until the current is shut off by the disappearance of arc discharge.

Thus, "shut off", which means disappearance of a current passing through breaker 10, is distinguished from mechanical "opening" of contacts 13R, 13S, 13T. As described above, by taking into account of arc time $T_{arc}$ where contact 13R of the reference phase (R phase) is in a noncontact state, it becomes possible to precisely expect target shut-off time point $T_{target}$.

Thus, opening timing operating portion 84 sets the time point for outputting opening signal 90A to a time point (time point t3 in FIG. 3) obtained by subtracting shut-off time $T_{shutoff}$ from target shut-off time point $T_{target}$ (time point t5 in FIG. 3), and stores it in the memory of control portion 80. Opening timing operating portion 84 also calculates the time between reference time point $T_{reference}$ and the time point for outputting opening signal 90A (the time between time points t2 and t3 in FIG. 3) as an operation synchronous time $T_{sync}$, and stores it in the memory of control portion 80.

As a result, operation control portion 82 of control portion 80 outputs opening signal 90A to breaker 10 at time point t3 where operation synchronous time $T_{sync}$ has elapsed since reference time point $T_{reference}$ (time point t2). According to the expectation, at time point t4 where opening operation time $T_{open}$ has elapsed since time point t3, contacts 13R, 13S, 13T of breaker 10 are opened simultaneously for the three phases. Then, at target shut-off time point $T_{target}$ (time point t5) where arc time $T_{arc}$ has further elapsed since time point t4, the currents are shut off.

In the first embodiment, opening operation time $T_{open}$ is the same for the three phases. When it is different for each phase, opening timing operating portion 84 calculates the time point for outputting opening signal 90A for each phase, based on opening operation time $T_{open}$ that is different for each phase.

Referring to FIG. 2 again, the procedure of the opening operation of breaker 10 is summarized as follows.

In step S7, opening timing operating portion 84 of control portion 80 calculates the above-described target shut-off time point $T_{target}$ and output time point (t3 in FIG. 3) of opening signal 90A, and stores these time points in the memory of control portion 80.

In next step S8, operation control portion 82 of control portion 80 outputs opening signal 90A to breaker 10 at the output time point calculated at step S7, and whereby breaker 10 shuts off the currents.

In next step S9, residual flux detecting portion 83 of control portion 80 calculates the residual flux for each phase based on the voltage waveform measured by voltage measuring portions 35R, 35S, 35T on the transformer side, and stores the calculated magnetic flux in the memory of control portion 80. In the following, referring to FIG. 4, a method of calculating the residual flux will be described.

Figure 4:
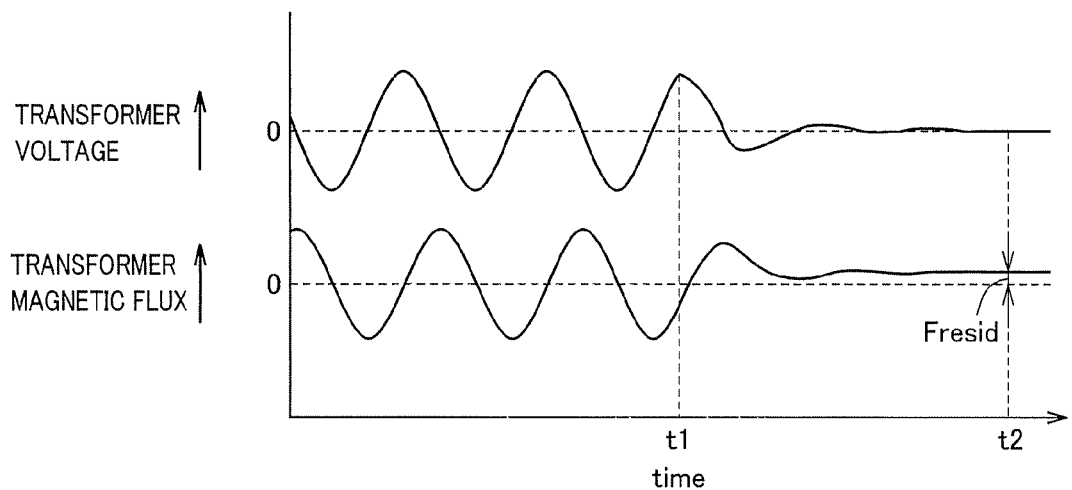
FIG. 4 is a graph showing the relationship between the transformer voltage and the residual flux of transformer 30.

FIG. 4 is a graph showing the relationship between the transformer voltage and the residual flux of transformer 30. The vertical axis in FIG. 4 shows, from the upper side, the transformer voltage and the transformer magnetic flux. The transformer magnetic flux is a magnetic flux signal obtained by integrating the transformer voltages. The horizontal axis shows the elapsed time.

Referring to FIG. 4, when breaker 10 shuts off currents at time point t1, the transformer voltage gradually attenuates and converges to zero voltage. A constant magnetic flux signal of direct current component at time point t2 where the transformer voltage has converged to zero voltage is a residual flux $F_{resid}$.

Specifically, in order to calculate residual flux $F_{resid}$, residual flux detecting portion 83 in FIG. 1 is configured to store the transformer voltages retrospectively for a certain time, wherein the transformer voltages are the measurement values of voltage measuring portions 35R, 35S, 35T on the transformer side. Residual flux detecting portion 83 calculates the average value of magnetic flux signals of the time corresponding to, for example, one cycle, before time point t1 where breaker 10 shuts off currents, thereby calculating the zero value of the magnetic flux signal. Then, residual flux detecting portion 83 calculates residual flux $F_{resid}$ by subtracting the calculated zero value of magnetic flux signal from the magnetic flux at time point t2 where the transformer voltage has converged to zero voltage.

Referring to FIG. 2 again, after control portion 80 has performed the opening operation of steps S7-S9, it goes back to step S1 and repeatedly performs steps S1-S4. Then, next, receiving closing command 50B (YES in step S5, NO in step S6), control portion 80 performs the closing operation of breaker 10 shown in steps S10-S15.

In the closing operation of breaker 10, a current of one of the three phases is applied in advance, and subsequently, currents of the other two phases are applied. In the first embodiment, the current of R phase that was shut off at voltage zero point when the breaker 10 shut off currents is firstly applied. In the following, the phase of which current is firstly applied is referred to as a first apply phase.

Figure 5:
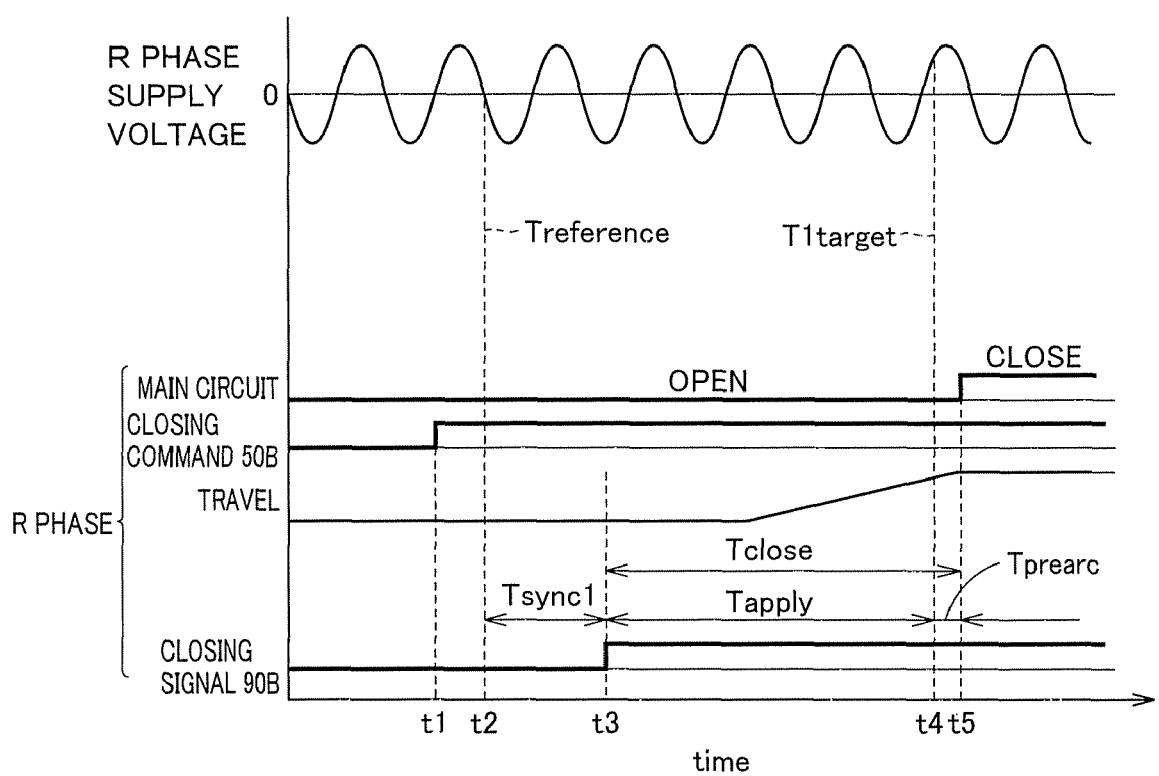
FIG. 5 is a timing chart used for describing the closing operation of a first apply phase (R phase) of breaker 10.

FIG. 5 is a timing chart used for describing the closing operation of the first apply phase (R phase) of breaker 10. In FIG. 5, the vertical axis shows, from the upper side, supply voltage, opening/closing state of the main circuit of breaker 10, closing command 50B, operation track (travel) of the contacts of breaker 10, and closing signal 90B. The horizontal axis in FIG. 5 shows the elapsed time.

Referring to FIG. 5, receiving closing command 50B at time point t1, reference time point detecting portion 81 of control portion 80 detects a cycle of voltage zero point of each phase based on the supply voltage measured by voltage measuring portions 15R, 15S, 15T on the electric power system side. Then, reference time point detecting portion 81 sets the voltage zero point of R phase, which is the first apply phase, as reference time point $T_{reference}$ (time point t2 in FIG. 5), and stores it in the memory of control portion 80.

Further, reference time point detecting portion 81 integrates the voltage waveform of the supply voltage measured by voltage measuring portions 15R, 15S, 15T on the electric power system side, thereby calculating steady magnetic flux of each phase. Steady magnetic flux is magnetic flux of the steady state that cyclically changes.

Taking into account of an apply time $T_{apply}$, which will be described later, closing timing operating portion 85 of control portion 80 sets a target apply time point $T1_{target}$ (time point t4 in FIG. 5), which is the time point for applying the current of the first apply phase (R phase) by breaker 10, and stores it in the memory of control portion 80. Target apply time point $T1_{target}$ is the time point where the steady magnetic flux of the first apply phase (R phase) and the residual flux of the first apply phase (R phase) of the transformer agree with each other. Thus, the magnetizing inrush current after the current of the first apply phase (R phase) is applied can be minimized.

Further, closing timing operating portion 85 calculates expected apply time $T_{apply}$, based on measurement data 60 of ambient temperature, operation pressure, control voltage of operation devices 12R, 12S, 12T. Here, apply time $T_{apply}$ is the time since operation control portion 82 outputs closing signal 90B to breaker 10 and until contact 13R of breaker 10 approaches and pre-arc (preceding arc) is started (the time between time points t3 and t4 in FIG. 5). Apply time $T_{apply}$ is equal to the time obtained by subtracting a pre-arc time $T_{prearc}$ from a closing operation time $T_{close}$. Closing operation time $T_{close}$ is the time since operation control portion 82 outputs closing signal 90B to breaker 10 and until contact 13R of the first apply phase (R phase) of breaker 10 closes (the time between time points t3 and t5 in FIG. 5). Pre-arc time $T_{prearc}$ is the time in which arc discharge occurs by the approach of contact 13R of breaker 10 (the time between time points t4 and t5 in FIG. 5).

As above, "apply" meaning the occurrence of current passing through breaker 10 is distinguished from mechanical "closing" of contacts 13R, 13S, 13T. As described above, by taking into account of pre-arc time $T_{prearc}$ where contact 13R of the first apply phase (R phase) is in a noncontact state, it becomes possible to precisely expect target apply time point $T1_{target}$.

Thus, closing timing operating portion 85 sets the time point (time point t3 in FIG. 5) obtained by subtracting apply time $T_{apply}$ from target apply time point $T1_{target}$ (time point t3 in FIG. 5) of R phase as the output time point of closing signal 90B of R phase, and stores it in the memory of control portion 80. Closing timing operating portion 85 also calculates the time from reference time point $T_{reference}$ and until when closing signal 90B of R phase is output (the time between time points t2 and t3 in FIG. 5) as an operation synchronous time $T_{sync1}$ of R phase, and stores it in the memory of control portion 80.

As a result, operation control portion 82 in FIG. 1 outputs closing signal 90B of R phase to breaker 10 at time point t3 where operation synchronous time $T_{sync1}$ has elapsed since reference time point $T_{reference}$ (time point t2 in FIG. 5). According to the expectation, at target apply time point $T1_{target}$ at time point t5 where apply time $T_{apply}$ has elapsed, a current starts to flow through R phase of transformer 30.

However, since the closing operation time of the breaker and the pre-arc time depend on the ambient temperature, operation pressure, control voltage of operation devices 12R, 12S, 12T of breaker 10 and the like, there are variations. As a result, the actual time point where the current is applied in R phase may be deviated from target apply time point $T1_{target}$. The procedure of closing operation of breaker 10 of the first embodiment takes into account of this deviation of the apply time point.

Referring to FIG. 2 again, the procedure of the closing operation of breaker 10 is described.

Receiving closing command 50B, first, in step S10, closing timing operating portion 85 of control portion 80 calculates target apply time point $T1_{target}$ of the first apply phase (R phase) and a time point (time point t3 in FIG. 5) for outputting closing signal 90B of the first apply phase (R phase), and stores these time points in the memory of control portion 80.

In next step S11, operation control portion 82 of control portion 80 outputs closing signal 90B to breaker 10 at the output time point calculated in step S10. Thus, a current of the first apply phase (R phase) is applied by breaker 10.

In next step S12, magnetizing inrush current determining portion 86 of control portion 80 determines whether or not a current measured by current measuring portions 40R, 40S, 40T has exceeded a threshold current during a determination time of one cycle, since the current of the first apply phase (R phase) is applied by breaker 10. When a current exceeding the threshold current is detected and the magnetizing inrush current is present (YES in step S12), control portion 80 proceeds to step S13.

In step S13, operation control portion 82 of control portion 80 outputs opening signal 90A of the first apply phase (R phase) to breaker 10. Thus, the current of the first apply phase (R phase) is again shut off by breaker 10.

In next step S14, residual flux detecting portion 83 of control portion 80 integrates voltage waveforms measured by voltage measuring portions 35R, 35S, 35T on transformer 30 side, thereby calculating again the residual flux for each phase. Residual flux detecting portion 83 stores the residual flux calculated again in the memory of control portion 80. Thereafter, control portion 80 goes back to step S1 and repeatedly performs steps S1-S4. When control portion 80 again receives closing command 50B (YES in step S5, NO in step S6), the closing operation of steps S10-S15 are again performed.

On the other hand, in step S12, when magnetizing inrush current determining portion 86 of control portion 80 determines that a magnetizing inrush current has not occurred (NO in step S12), control portion 80 goes to step S15. In step S15, the currents of S and T phases are applied by breaker 10 at the voltage zero point of R phase being the first apply phase.

Specifically, similarly to R phase, closing timing operating portion 85 of control portion 80 calculates a target apply time point $T2_{target}$ of S phase and T phase so that the currents of S and T phases are applied by breaker 10 at the voltage zero point of R phase of the first apply phase. Operation control portion 82 outputs closing signal 90B of S phase and T phase at a time earlier than target apply time point $T2_{target}$ by apply time $T_{apply}$. Thus, by the application of the currents of S and T phases by breaker 10, the procedure starting from opening of the breaker until closure thereof ends.

In the following, using waveforms of the voltage, current and magnetic flux of each phase of operation control apparatus 1, the procedure of the closing operation of breaker 10 of the first embodiment is described in further detail.

Figure 6:
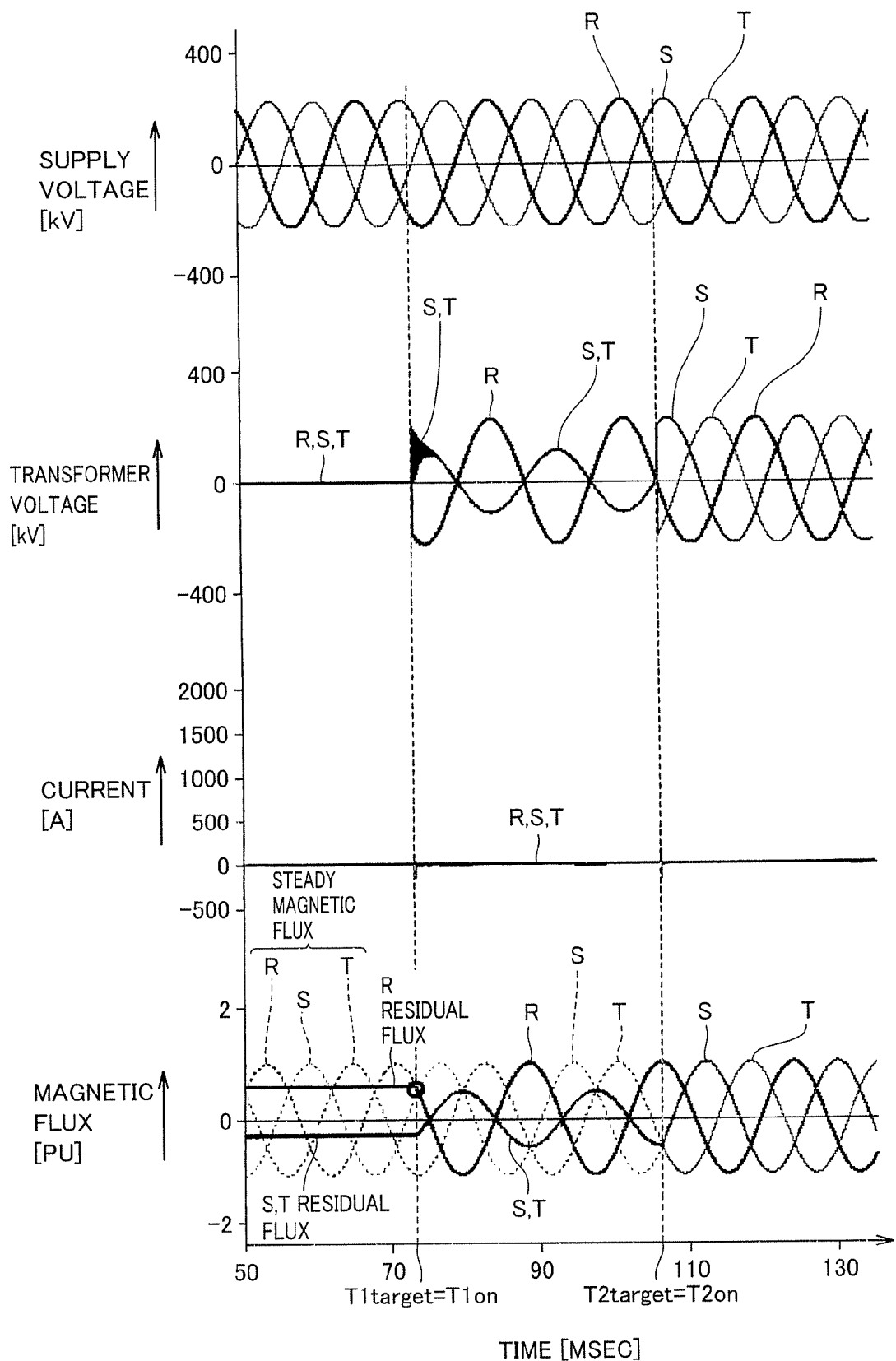
FIG. 6 is a graph showing waveforms of the voltage, current and magnetic flux of each phase when the current of the first apply phase (R phase) is applied by breaker 10 at target apply time point $T1_{target}$.

FIG. 6 is a graph showing waveforms of the voltage, current and magnetic flux of each phase when the current of the first apply phase (R phase) is applied by breaker 10 at target apply time point $T1_{target}$. In FIG. 6, the vertical axis shows, from the upper side, supply voltage, transformer voltage, current, magnetic flux of each phase of transformer 30, while horizontal axis shows the time. The solid line in the graph of the magnetic flux represents magnetic flux actually occurring in the core of transformer 30, while the broken line represents steady magnetic flux. Reference characters R, S, T represent R, S, T phases, respectively.

Referring to FIG. 6, the current of R phase is applied by breaker 10 at apply time point T1on, while the currents of S- and T-phases are applied by breaker 10 at apply time point T2on. Apply time point T1on is equal to target apply time point $T1_{target}$ of R phase, while apply time point T2 is equal to target apply time point $T2_{target}$ of S phase and T phase.

Before apply time point T1on, residual flux is occurring in the core of transformer 30. As shown in FIG. 6, the residual flux of the first apply phase (R phase) is the greatest, while the residual fluxes of S phase and T phase are about half the magnitude of the first apply phase (R phase). This is because breaker 10 shuts off currents simultaneously for the three phases at the voltage zero point of the first apply phase (R phase).

Next, at target apply time point $T1_{target}$ in FIG. 6, the residual flux and the steady magnetic flux of the first apply phase (R phase) are equal to each other. Since the current of the first apply phase (R phase) is applied at this timing, the direct current component of the magnetic flux of the first apply phase (R phase) after being applied becomes substantially 0 (i.e., the positive and negative amplitudes of the magnetic flux are substantially equal), and the magnetizing inrush current can be minimized. Additionally, also as to the magnetic fluxes of S phase and T phase occurring by the current of the first apply phase (R phase) of transformer 30 after the first apply phase (R phase) was applied, the direct current component of each magnetic flux is substantially zero. The S- and T-phase magnetic fluxes are substantially equal to each other.

As a result, at target apply time point $T2_{target}$, which is the voltage zero point of the first apply phase (R phase), the magnetic fluxes occurring in S phase and T phase and the steady magnetic fluxes of S phase and T phase are equal to each other. Since the currents of S phase and T phase are applied by breaker 10 at this timing, the magnetizing inrush current can also be minimized for S phase and T phase.

Figure 7:
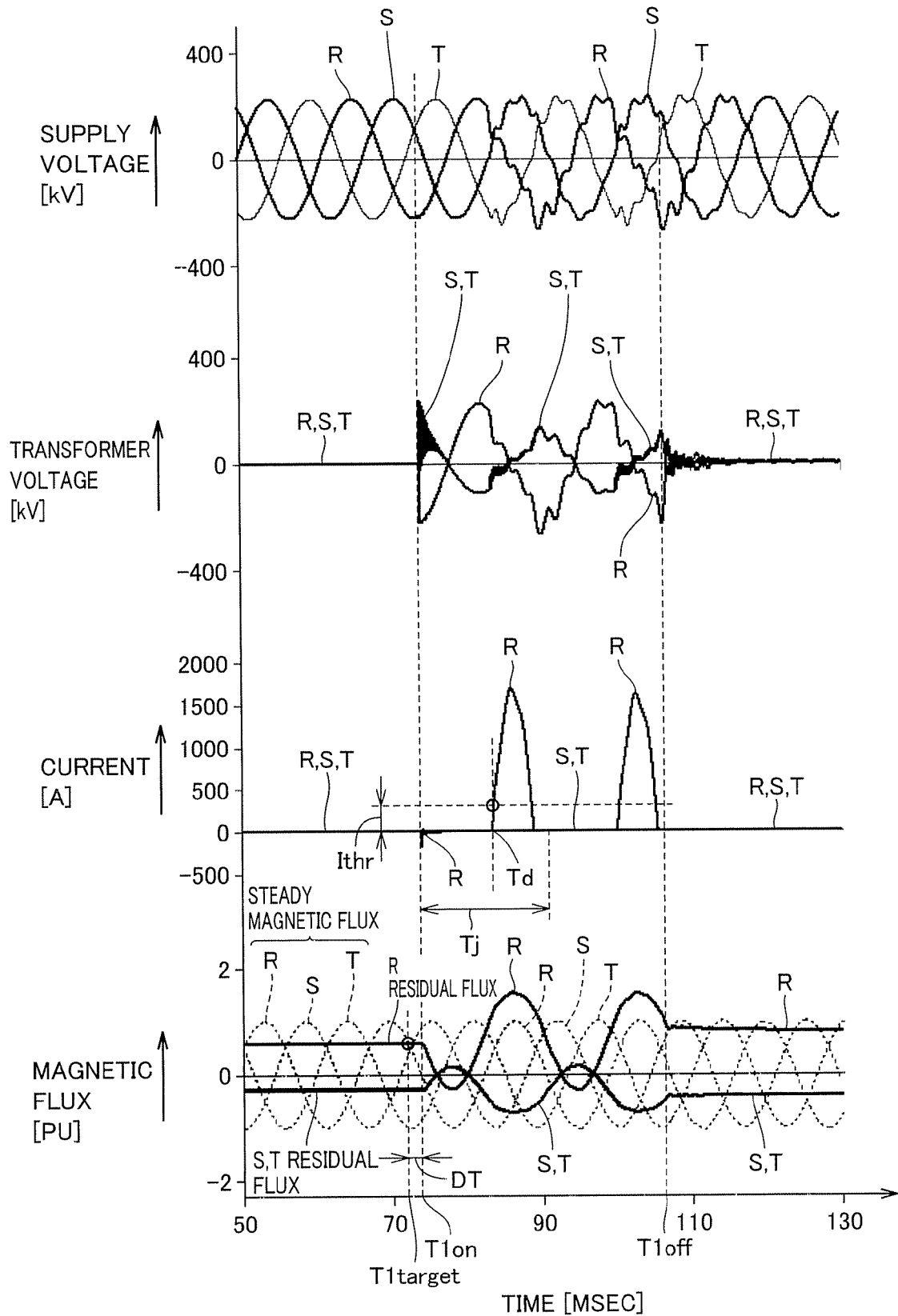
FIG. 7 is a graph showing waveforms of the voltage, current and magnetic flux of each phase when the current of the first apply phase (R phase) is applied by breaker 10 at a time point deviating from target apply time point $T1_{target}$.

FIG. 7 is a graph showing waveforms of the voltage, current and magnetic flux of each phase when the current of the first apply phase (R phase) is applied by breaker 10 at a time point deviating from target apply time point $T1_{target}$. In FIG. 7, the vertical axis shows, from the upper side, supply voltage, transformer voltage, current, magnetic flux of each phase of transformer 30, while horizontal axis shows the time. The solid line in the graph of the magnetic flux represents magnetic flux actually occurring in the core of transformer 30, while the broken line represents steady magnetic flux. Reference characters R, S, T represent R, S, T phases, respectively.

In FIG. 7, apply time point T1 where the current of the first apply phase (R phase) is applied is delayed by time DT from target apply time point $T1_{target}$ where the residual flux and the steady magnetic flux of the first apply phase (R phase) are equal to each other. Accordingly, the direct current component of the magnetic flux of the first apply phase (R phase) after being applied does not become 0, whereby a magnetizing inrush current occurs in the first apply phase (R phase) of transformer 30. Also, as to the magnetic fluxes occurring in the S phase and T phase by the application of the current of the first apply phase (R phase), the direct current component does not become 0.

As described above, the deviation of the timing for applying the current of the first apply phase (R phase) is determined by whether or not an absolute value of a current detected in determination time Tj, which is one cycle since apply time point T1on, has exceeded a threshold current Ithr. In the case shown in FIG. 7, it is sensed that the current of the first apply phase (R phase) has exceeded threshold current Ithr at time point Td. As a result, the current of the first apply phase (R phase) is shut off by breaker 10 at shut-off time point T1off.

Figure 8:
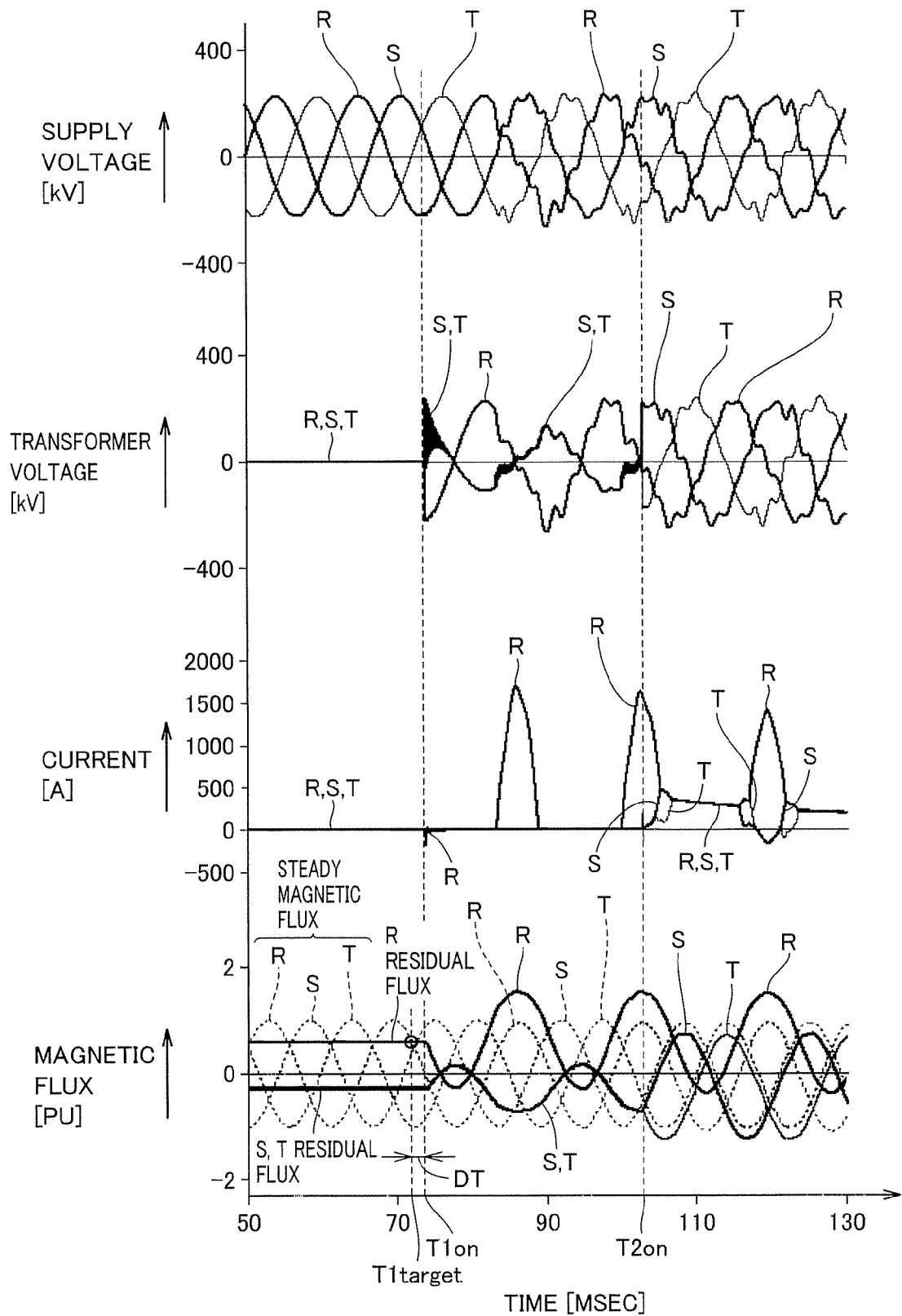
FIG. 8 is a graph, as a comparative example against the example of FIG. 7, showing waveforms of the voltage, current and magnetic flux of each phase.

FIG. 8 is a graph, as a comparative example against the example of FIG. 7, showing waveforms of the voltage, current and magnetic flux of each phase. In FIG. 8, the vertical axis shows, from the upper side, supply voltage, transformer voltage, current, magnetic flux of each phase of transformer 30, while horizontal axis shows the time. The solid line in the graph of the magnetic flux represents magnetic flux actually occurring in the core of transformer 30, while the broken line represents steady magnetic flux. Reference characters R, S, T represent R, S, T phases, respectively.

Being different from FIG. 7, in FIG. 8, the current of the first apply phase (R phase) is not shut off by breaker 10, and following the application of the current of the first apply phase (R phase), currents of S and T phases are applied by breaker 10 at apply time T2on. In this case, even if the apply time point T2on of currents of S and T phases is at the timing of the voltage zero point of the first apply phase (R phase), the direct current component of the magnetic fluxes of S phase and T phase after apply time point T2on does not become 0. Accordingly, after apply time point T2on, in addition to the magnetizing inrush current of the first apply phase (R phase), abnormal magnetizing inrush currents also occur for S phase and T phase.

As described above, according to transformer operation control apparatus 1 of the first embodiment, the current of the first apply phase is once shut off by breaker 10, when the timing for applying the current of the first apply phase deviates from target apply time point T1$_{target}$ because of variations in closing operation time T$_{close}$ of breaker 10 and pre-arc time T$_{prearc}$. Then, the current of the first apply phase is again applied at target apply time point T1$_{target}$ calculated again based on the residual flux at the time of shut off. Thereafter, only when it is confirmed that the first apply phase has been applied at the appropriate timing, the currents of the other phases are applied by the breaker. Therefore, according to the first embodiment, it becomes possible to minimize the period during which the magnetizing inrush current passes through transformer 30. Whether or not the apply time point of the first apply phase has deviated from target apply time point T1$_{target}$ can easily be detected depending on whether or not the current of the first apply phase after being applied has exceeded the threshold current.

It is to be noted that, being different form the first embodiment described above, at the time of shut off by breaker 10, it is possible to shut off currents simultaneously for the three phases without considering the voltage zero point of any of the three phases, and to use the phase having the greatest residual flux at the time of shut off as the first apply phase at the time of application. In this case also, similarly to the first embodiment, the target apply time point of the first apply phase is set at the time point where the residual flux and steady magnetic flux of the first apply phase are equal to each other. The currents of the other two phases are applied by breaker 10 at the voltage zero point of the first apply phase.

With such a method also, the magnetizing inrush current can be suppressed to the same degree as the first embodiment.

Second Embodiment

A second embodiment is different from the first embodiment in the determination condition of verifying the suppression effect on the magnetizing inrush current. In the second embodiment, apply time point T1on of the current of the first apply phase is actually detected, and a deviation from target apply time point T1$_{target}$ is determined. When the difference between actual apply time point T1on and target apply time point T1$_{target}$ is not in a tolerance range, it means that the residual flux and steady magnetic flux of the first apply phase at the time of application are different from each other. Accordingly, a magnetizing inrush current occurs.

Figure 9:
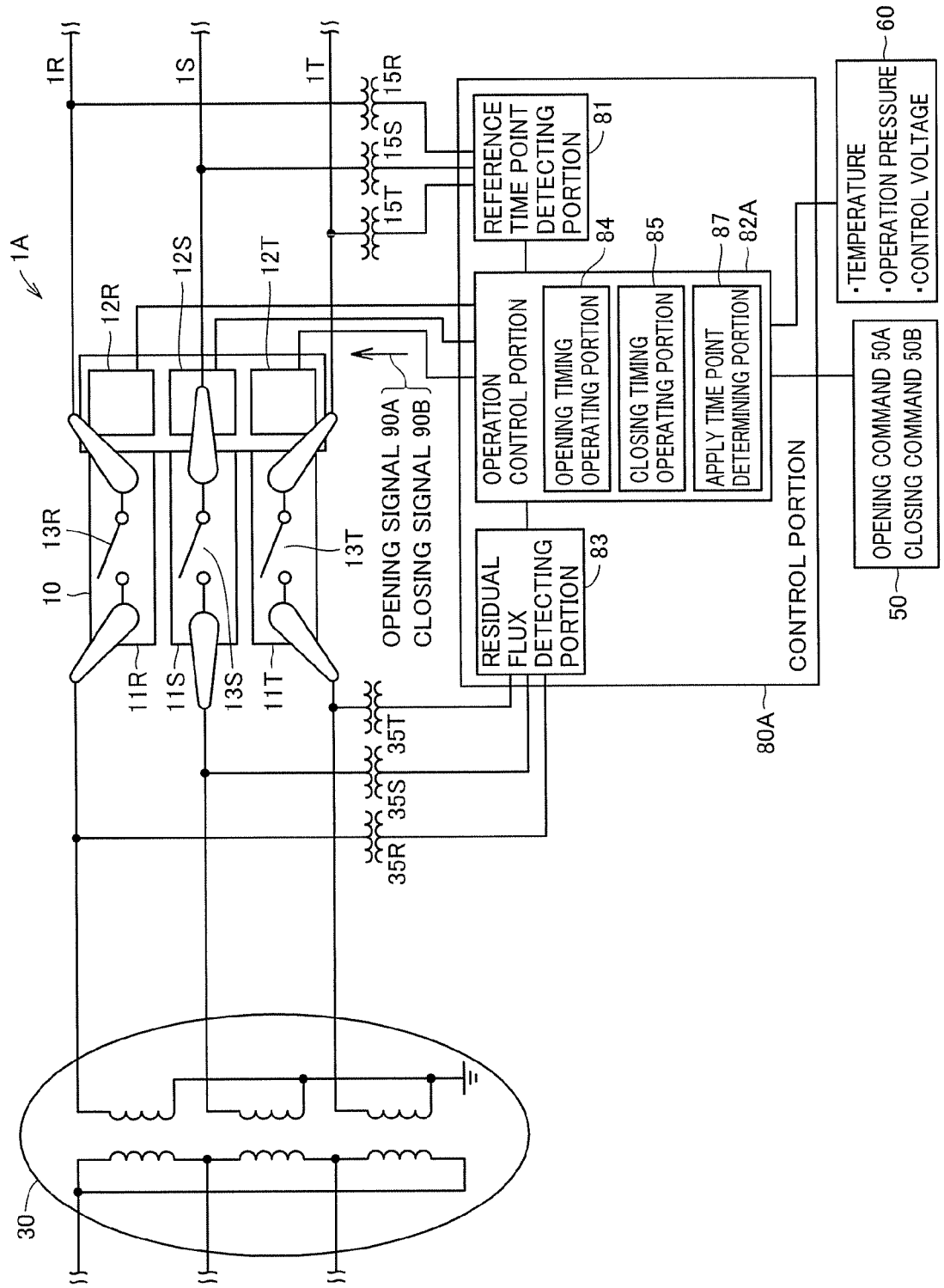
FIG. 9 is a block diagram showing a configuration of a transformer operation control apparatus 1A of a second embodiment of the present invention.

FIG. 9 is a block diagram showing a configuration of a transformer operation control apparatus 1A of the second embodiment of the present invention. Transformer operation control apparatus 1A is different from operation control apparatus 1 in FIG. 1 in that it includes apply time point determining portion 87 instead of magnetizing inrush current determining portion 86. Also, transformer operation control apparatus 1A in FIG. 9 is different from transformer operation control apparatus 1 in FIG. 1 in that it does not include current measuring portions 40R, 40S, 40T. Transformer operation control apparatus 1A is the same as operation control apparatus 1 in FIG. 1 in other points, and therefore description thereof is not repeated.

Figure 10:
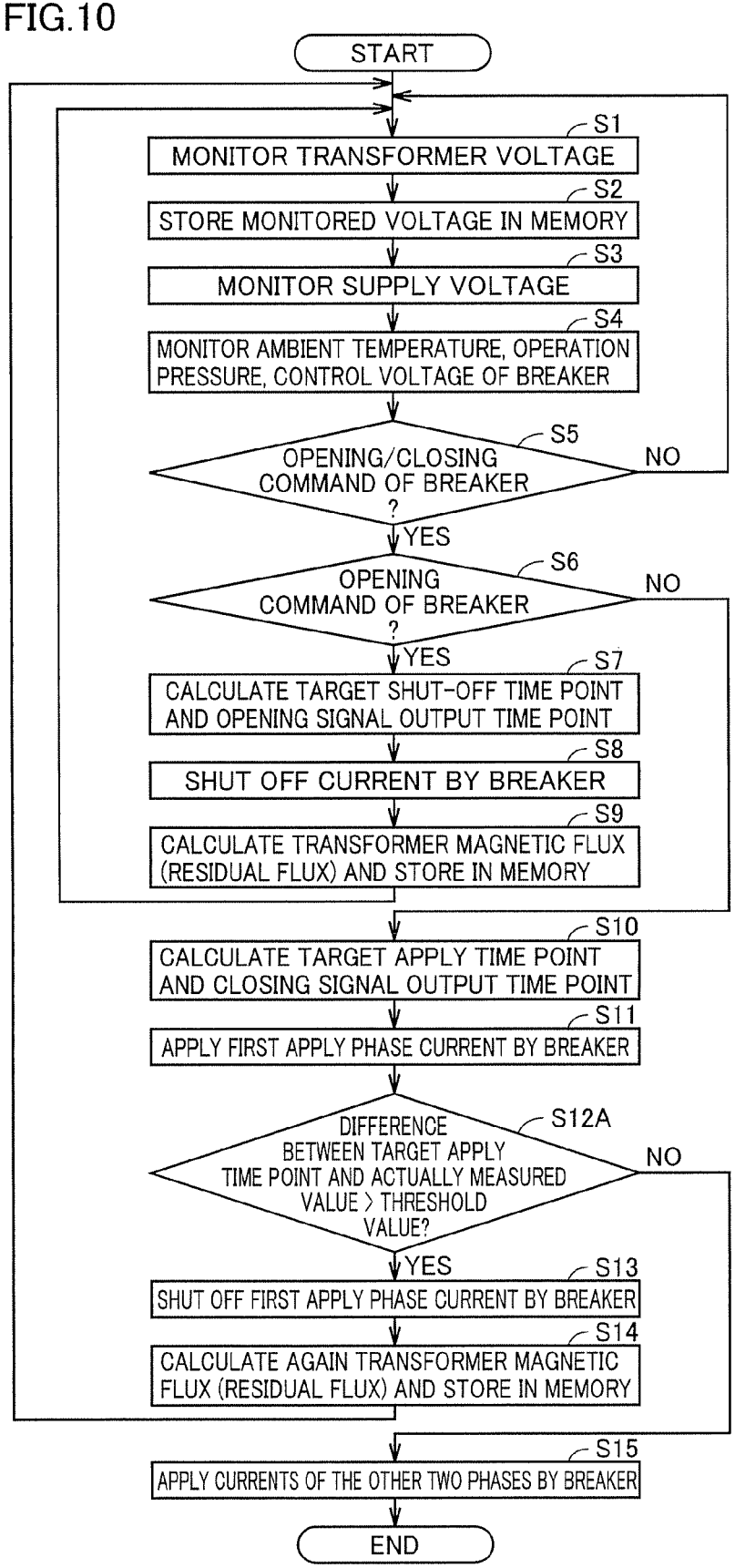
FIG. 10 is a flowchart showing a control procedure of the opening/closing operation of breaker 10 by a control portion 80A in FIG. 9.

FIG. 10 is a flowchart showing a control procedure of the opening/closing operation of breaker 10 by a control portion 80A in FIG. 9. The control procedure of FIG. 10 is different from that of FIG. 2 in that it includes step S12A instead of step S12 of FIG. 2. The control procedure of FIG. 10 is the same as that of FIG. 2 in other points, and therefore description thereof is not repeated.

First, a method of detecting actual apply time point T1on of the first apply phase (R phase) is described. Referring to FIG. 7, when the current of the first apply phase (R phase) is detected at apply time point T1on, the transformer voltage changes from zero voltage. Accordingly, by detecting the time point where the transformer voltage not smaller than a predetermined threshold voltage occurs, actual apply time point T1on can be obtained. Using apply time point T1on actually measured in this manner, a deviation of the timing for applying the current of the first apply phase (R phase) is determined.

Specifically, referring to FIGS. 7, 9 and 10, in step S12A of FIG. 10, apply time point determining portion 87 of control portion 80 determines whether or not an absolute value of a difference DT between detected apply time point T1on and target apply time point T1$_{target}$ has exceeded a threshold time. The threshold time may be determined to be about 10% of one cycle of AC power supply, for example. When the absolute value of difference DT has exceeded the threshold time, the control goes to step S13, where the contact of the first apply phase of breaker 10 is once opened. On the other hand, when the absolute value of difference DT has not exceeded the threshold time, control portion 80A goes to step S15, where the currents of the other phases are applied by breaker 10.

According to transformer operation control apparatus 1A of the second embodiment, the period during which the magnetizing inrush current passes through transformer 30 can be minimized similarly to the first embodiment. Additionally, since the deviation of the apply timing is determined by difference DT between the time point where transformer voltage has changed from the zero voltage and target apply time point T1$_{target}$, it is not necessary to provide current measuring portions 40R, 40S, 40T, being different from the first embodiment.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A transformer operation control apparatus, comprising:
    a transformer connected to a three-phase electric power system;
    a breaker connected between said electric power system and said transformer and being capable of shutting off and applying a current for each phase of three phases;
    a first voltage measuring portion measuring a voltage of each phase, on a side of said electric power system, of said breaker;
    a second voltage measuring portion measuring a voltage of each phase, on a side of said transformer, of said breaker; and
    a control portion receiving an opening command and a closing command, and controlling timing for shutting off and applying the current for each phase by said breaker, wherein
    when said control portion receives said closing command, said control portion exerts control so that said breaker applies a current of a first phase among the three phases at a target apply time point determined based on measurement values of said first and second voltage measuring portions, and said control portion determines whether or not a determination condition for verifying a suppression effect on a magnetizing inrush current is satisfied,
    when said determination condition is not satisfied, said control portion exerts control so that said breaker shuts off the current of said first phase and again applies the current of said first phase at the target apply time point determined again based on the measurement values of said first and second voltage measuring portions, and said control portion determines again whether or not said determination condition is satisfied, and
    when said determination condition is satisfied, said control portion exerts control so that said breaker applies currents of the other two phases except for said first phase.

2. The transformer operation control apparatus according to claim 1, further comprising
    a current measuring portion measuring a current of each phase, on a side of said transformer, of said breaker; wherein
    said determination condition includes a condition that, during a predetermined determination time since the current of said first phase is applied by said breaker, an absolute value of the current measured by said current measuring portion does not exceed a predetermined threshold current.

3. The transformer operation control apparatus according to claim 1, wherein
    said determination condition includes a condition that, by the application of the current of said first phase, an absolute value of a difference between a time point where the voltage measured by said second voltage measuring portion has changed from zero voltage and said target apply time point does not exceed a predetermined threshold time.

4. The transformer operation control apparatus according to claim 1, wherein said target apply time point is a time point where a steady magnetic flux of said first phase agrees with a residual flux of said first phase,
    said steady magnetic flux is a magnetic flux in a steady state that cyclically changes and that is obtained by time integration of voltage waveforms measured by said first voltage measuring portion, and
    said residual flux is a constant magnetic flux that remains in a core of said transformer when said breaker shuts off the current in response to receipt of said opening command by said control portion and that is obtained by time integration of voltage waveforms measured by said second voltage measuring portion.

5. The transformer operation control apparatus according to claim 4, wherein
    when said control portion receives said closing command, said control portion outputs a closing signal for closing a contact of said first phase of said breaker at a time point earlier than said target apply time point by an apply time of said breaker, and
    said apply time is a time obtained by subtracting a pre-arc time from a closing operation time necessary for the contact of said breaker to close.

6. The transformer operation control apparatus according to claim 4, wherein
    when said determination condition is satisfied, said control portion exerts control so that said breaker simultaneously applies said currents of the other two phases at a time point where an alternating current voltage of said first phase becomes zero.

7. The transformer operation control apparatus according to claim 4, wherein
    said control portion designates a phase where an absolute value of said residual flux is greatest as said first phase in receipt of said closing command.

8. The transformer operation control apparatus according to claim 4, wherein
    when said control portion receives said opening command, said control portion exerts control so that said breaker simultaneously shuts off currents of the three phases at a time point where an alternating current voltage of one of the three phases becomes zero, and said control portion designates a phase where a voltage at the time of shut off is zero as said first phase in receipt of said closing command.

9. A transformer operation control method, said transformer being connected to a three-phase electric power system via a breaker, said method comprising the steps of:
    measuring a voltage, on a side of said transformer, of said breaker;
    measuring a voltage, on a side of said electric power system, of said breaker;
    when applying a current by said breaker, selecting a first phase among three phases, and applying by said breaker the current of said first phase at a target apply time point determined based on measurement values of the voltages, on the side of said transformer and on the side of said electric power system, of said breaker;
    determining whether or not a determination condition for verifying a suppression effect on a magnetizing inrush current is satisfied;
    when said determination condition is satisfied, applying by said breaker currents of the other two phases except for said first phase; and
    when said determination condition is not satisfied, shutting off by said breaker the current of said first phase, and thereafter performing again said step of applying the current of said first phase and said step of determining.

10. The transformer operation control method according to claim 9, wherein
said determination condition includes a condition that, during a predetermined determination time since the current of said first phase is applied, an absolute value of the current, on the side of said transformer, of said breaker does not exceed a predetermined threshold current.

11. The transformer operation control method according to claim 9, wherein
said determination condition includes a condition that, by the application of the current of said first phase by said breaker, an absolute value of a difference between a time point where the voltage, on the side of said transformer, of said breaker has changed from zero voltage and said target apply time point does not exceed a predetermined threshold time.

12. The transformer operation control method according to claim 9, further comprising the steps of:
calculating a residual flux of each phase of said transformer by time integration of voltage waveforms, on the side of said transformer, of said breaker, when shutting off the current by said breaker; and
calculating a time point, as said target apply time point, where a magnetic flux in a steady state of said first phase of said transformer obtained by time integration of voltage waveforms, on the side of said electric power system, of said breaker is equal to the calculated residual flux of said first phase, when applying the current by said breaker.

13. The transformer operation control method according to claim 12, wherein
in said step of applying the currents of the other two phases, the currents of the other two phases are simultaneously applied by said breaker at a time point where an alternating current voltage of said first phase becomes zero.

14. The transformer operation control method according to claim 12, wherein
a phase where an absolute value of said residual flux is greatest is designated as said first phase, when applying the current by said breaker.

15. The transformer operation control method according to claim 12, further comprising a step of
shutting off the currents of the three phases simultaneously at a time point where an alternating current voltage of one of the three phases becomes zero, when shutting off the current by said breaker, wherein
designating a phase where a voltage at the time of shut off is zero in said step of shutting off the currents as said first phase, when applying the current by said breaker.

* * * * *